3,378,365
PROCESS FOR THE PRODUCTION
OF POROUS METALS
Ludwig Bruns and Günther Schnuchel, Dormagen, Germany, assignors to Erdolchemie Gesellschaft mit beschrankter Haftung, Leverkusen, Germany, a corporation of Germany
No Drawing. Filed May 27, 1964, Ser. No. 370,668
Claims priority, application Germany, July 15, 1963, E 25,153
8 Claims. (Cl. 75—20)

This invention relates to porous metals and their production.

Porous metal bodies are used for many technical purposes. Their permeability to gases or liquids is important. Such porous bodies can be used, for example, for chemical catalysis, diffusion or filtration. Since such porous metals have a large surface area in proportion to volume, shaped parts made of this material can also be used for purposes where the configuration of the surface is of decisive importance, e.g. adsorption, chemical catalysis and electrolysis.

The usual way of producing porous metals is to sinter finely-divided or small-grain metal. Such processes require considerable technical outlay with regard to shaping the parts and the maintenance of specific sintering temperatures and press pressures. They are also dependent on complicated pre-treatment methods for the metals such as e.g. pickling processes, ensuring specific grain sizes, etc.

It has now been found that it is possible in a very simple manner to produce porous metals in any desired shape by preparing or impregnating a form carrier, which is adapted to be destroyed by oxidation, with a chemical compound of the relevant metal, and then liberating the metal from the chemical compound with simultaneous or subsequent destruction of the form carrier.

Eminently suitable as form carriers are fibrous, felted, three-dimensional structures which can consist e.g. of cellulose and cellulose derivatives, and all natural or synthetic materials which can be destroyed by oxidation and do not melt below the decomposition temperature of the chemical metal compound used, such as e.g. coal, sawdust etc. It is also advantageous to start with considerably felted materials, in which the fibers are not in any particular order, since this gives a particular strength to the metal body which is obtained.

The process according to the invention will be explained hereinafter with reference to an example relating to the production of a porous silver plate such as may be used e.g. in special electrolysis problems. Other porous metals can be produced in a corresponding manner and examples are copper, platinum, nickel, cadmium, lead, cobalt, manganese, iron or chromium.

The production of a silver plate with a pore volume of 70–90% can be effected as follows: First of all the material selected as a temporary carrier e.g. cellulose fibers, is processed with a melt of an organic silver salt, preferably a melt or a concentrated aqueous solution of silver lactate, in a kneading machine to form a uniform composition. Other silver compounds which are suitable are silver compounds which can be decomposed by heating, possibly in the presence of oxygen, to obtain silver, e.g. silver oxide, silver nitrate, and organic silver salts, particularly the silver salts of $\alpha$-hydroxy carbonic acids. The shaping of this composition obtained in this way to the desired plate size can be effected by pouring or pressing the as yet non-solidified composition into a suitable mould. Naturally, it is also possible to form a plate from an aqueous suspension of cellulose fibers, similar to the technique used in paper manufacture, and then to impregnate the said plate with the melt of organic silver salt.

The production of the actual metal body is effected by heating the shaped part to the decomposition temperature of the silver compound. When this is done, the silver is liberated and the carrier is destroyed completely by oxidation. An extremely porous plate is obtained which consists of pure silver and no longer contains any admixtures of organic material. In the case of metals which are less noble than silver, it is possible for the metal skeleton to consist partly of the relevant metallic oxides, which can then be converted subsequently by a suitable reduction process to the free metals.

The pore volume of the plate corresponds exactly to the volume of the carrier used and has also assumed the structure thereof. The process can be compared with the "dead mould casting" used in the bronze casting art. It will be apparent that the construction of the pore volume can be considerably influenced by the carrier material used. Thus, an extremely fine-structure silver can be obtained if a carrier of pre-formed cotton wool is used as the form carrier. Relatively coarse structures can be obtained e.g. by using sawdusts of different particle size.

It is also possible to use this process to produce porous metal surfaces on any other metallic material. An example which may be mentioned is the lining of reaction tubes for chemical processes. A lining of this kind can be produced e.g. by centrifuging on to the interior of a steel tube a paste consisting of a suitable carrier material and the melt of the metal compound e.g. an organic silver salt. The porous metal is produced as described hereinbefore by heating the decomposition temperature of the organic silver salt, whereupon the latter is converted to metallic silver and the carrier is burned out.

Generally, the metal bodies obtained in accordance with the process described hereinbefore have an adequate strength. If a particularly high strength is expected of porous shaped metal bodies or if a particularly close bond is desired between the porous metal layer and e.g. a tube wall, this can be obtained by subjecting the porous shaped metal body obtained or the porous metal layer produced to a further preparation with a relatively dilute aqueous solution of the metal compound e.g. the organic silver salt, and carrying out decomposition once more. This process welds individual metal fibers to one another or achieves a metal-to-metal bond with the tube wall.

Another possibility of increasing the strength of such shaped metal bodies or layers comprises mixing partly non-destructible material, e.g. asbestos, brass cloth or wire cloth, with the material which is to be destroyed by heat treatment. The proportion of reinforcing material used will generally not exceed 10% by weight.

If it is desired to increase the pore volume beyond the volume of the carrier used, it is possible to achieve this by the addition of organic or inorganic propellants such as e.g. sulfonic acid hydrazides or decomposible carbonates, etc. According to this process, it is also readily possible to produce porous metals with special properties. These properties, which concern strength, stability, etc., can be obtained by the admixture of other organic metal salts e.g. of copper, gold, platinum, cobalt, nickel etc., e.g. in quantities of 10, 30, or 50% by weight.

Example 1

In a mould of non-rusting sheet steel 500 x 300 x 10 mm. in size, a mat is pressed from moistened cotton cellulose by the application of a pressure of 2 kg./cm.$^2$. The mat is impregnated in the mould with a silver lactate melt. After solidification, the mould is introduced into an electrically heated oven and heated slowly to a temperature of 300° C. This temperature is maintained for about two hours and then cooling is allowed. The finished, porous silver plate can then be taken from the mould. It has a silver-white exterior and contains no other impurities. The specific gravity amounts to 1.13. With the specific gravity of 10.5 of silver, a pore volume of 93% is obtained.

Example 2

A cup pre-formed from paper cellulose of diameter 5 cm., a height of 12 cm., and a wall thickness of 2 mm. is immersed in a melt of copper lactate until the paper cellulose has become saturated with the copper lactate melt. Then the cup is allowed to drip off and the shaped part is brought to a temperature of 350° C. in an electric oven. After about two hours the decomposition process has been completed. The copper has been converted partly to the form of its oxide. In order to convert it completely to metal, it is treated with methanol vapour at about 400° C. In this way a shaped part consisting of very porous metallic copper is obtained, which in its dimensions correspond exactly to the cellulose shaped part used as the temporary carrier.

Example 3

Round aluminum rods having a diameter of 10 mm. and 300 mm. in length are heated to 300° C. and sprayed with a silver lactate melt. This forms on the aluminum rod a thin, rough, securely adhering layer of pure silver. After the rod cools, it is provided with an approximately 3 mm. thick wound layer of pure paper cellulose. This paper cellulose coil is then impregnated uniformly with a silver lactate melt. After solidification, the rods thus prepared are introduced into a decomposition oven and heated for two hours to 320° C.

In order to carry out decomposition as carefully as possible, it is advisable to provide in the decomposition oven an atmosphere with a reduced oxygen concentration of about 10% vol. After decomposition has ended, aluminum rods are obtained which have a layer of highly porous, pure silver which adheres extremely securely.

We claim:

1. Process for the production of shaped highly porous metal structure, which comprises applying a metal compound, which is capable of being converted by heat to the corresponding metal, to a porous temporary support composed of a member selected from the group consisting of natural and synthetic particle material, which is capable of being substantially completely destroyed by combustion, sufficiently to fill substantially completely the pores of said support with said compound, and thereafter heating the filled support in the presence of oxygen for combustion substantially completely of said support and simultaneously for converting said metal compound to the corresponding metal, the resulting structure having a pore volume and structure corresponding exactly to said temporary support.

2. Process according to claim 1 wherein said metal compound is selected from the group consisting of silver, copper, platinum, nickel, cadmium, lead, cobalt, manganese, iron, chromium, and mixtures thereof.

3. Process according to claim 2 wherein said metal compound is the corresponding metal salt of an α-hydroxycarboxylic acid.

4. Process according to claim 3 wherein said salt is the corresponding lactic acid salt.

5. Process according to claim 4 wherein said salt is selected from the group consisting of silver lactate, copper lactate, and mixtures thereof.

6. Process according to claim 5 wherein said particle material is selected from the group consisting of natural cellulose fiber, regenerated cellulose fiber, synthetic fiber, and coal.

7. Process according to claim 1 wherein a propellant is included with said metal compound to increase the pore volume.

8. Process for the production of shaped highly porous metal structure, which comprises impregnating a pre-formed three-dimensional porous temporary support structure composed of a member selected from the group consisting of natural and synthetic particle material, which is capable of being substantially completely destroyed by combustion, with a molten metal salt of α-hydroxycarboxylic acid, which is capable of being converted by heat to the corresponding metal and in which the corresponding metal is selected from the group consisting of silver, copper, platinum, nickel, cadmium, lead, cobalt, manganese, iron, chromium, and mixtures thereof, sufficiently to fill substantially completely the pores of said support structure with said metal salt, and thereafter heating the filled support structure in the presence of oxygen for combustion substantially completely of said support structure and simultaneously for converting said metal salt to the corresponding metal, the resulting structure having a pore volume of 70–90% corresponding exactly to said temporary support structure.

References Cited

UNITED STATES PATENTS

| 1,919,730 | 7/1933 | Koenig et al. | 75—20 X |
| 2,901,441 | 8/1959 | Waterman | 252—463 |
| 3,224,846 | 12/1965 | Fiedler et al. | 75—20 X |

FOREIGN PATENTS

| 821,424 | 11/1951 | Germany. | |

CHARLES N. LOVELL, *Primary Examiner.*

DAVID L. RECK, *Examiner.*